(12) United States Patent
Mitchell et al.

(10) Patent No.: US 9,573,550 B1
(45) Date of Patent: Feb. 21, 2017

(54) SIDE CURTAIN AIRBAG COMPRESSION INFLATOR BRACKET

(71) Applicant: Autoliv ASP, Inc., Ogden, UT (US)

(72) Inventors: Abe Mitchell, Brigham, UT (US); Brian Fulmer, Hooper, UT (US); Rick Hallows, Layton, UT (US)

(73) Assignee: AUTOLIV ASP, INC., Odgen, UT (US)

( * ) Notice: Subject to any disclaimer, the term of this patent is extended or adjusted under 35 U.S.C. 154(b) by 0 days.

(21) Appl. No.: 14/827,926

(22) Filed: Aug. 17, 2015

(51) Int. Cl.
*B60R 21/217* (2011.01)
*B60R 21/232* (2011.01)
*B60R 21/213* (2011.01)

(52) U.S. Cl.
CPC ......... *B60R 21/2171* (2013.01); *B60R 21/213* (2013.01); *B60R 21/232* (2013.01)

(58) Field of Classification Search
CPC .... B60R 21/214; B60R 21/232; B60R 21/217; B60R 21/2171; B60R 21/213
See application file for complete search history.

(56) References Cited

U.S. PATENT DOCUMENTS

| | | | |
|---|---|---|---|
| 7,568,659 B2 | 8/2009 | Clute et al. | |
| 7,607,685 B2 | 10/2009 | Jang et al. | |
| 7,695,000 B2 | 4/2010 | Jang et al. | |
| 7,735,853 B2 * | 6/2010 | Fink | B60R 21/213 280/728.2 |
| 7,735,855 B2 | 6/2010 | Jang et al. | |
| 7,815,216 B2 * | 10/2010 | Minamikawa | B60R 21/201 280/728.2 |
| 7,862,075 B2 * | 1/2011 | Minamikawa | B60R 21/213 280/728.2 |
| 7,896,389 B2 | 3/2011 | Jang et al. | |
| 8,060,280 B2 | 11/2011 | Hadi et al. | |
| 8,141,897 B2 * | 3/2012 | Jang | B60R 21/213 280/728.2 |
| 8,727,371 B2 * | 5/2014 | Ochiai | B60R 21/232 280/728.2 |
| 2005/0046154 A1 * | 3/2005 | Rhea | B60R 21/213 280/728.2 |

(Continued)

FOREIGN PATENT DOCUMENTS

| | | | | |
|---|---|---|---|---|
| EP | 1 951 552 B1 | 4/2011 | | |
| JP | DE 19944052 A1 * | 3/2000 | ............ | B60R 21/23 |
| SE | GB 2397806 A * | 8/2004 | ......... | B60R 21/2171 |

*Primary Examiner* — Ruth Ilan
(74) *Attorney, Agent, or Firm* — Brinks Gilson & Lione (57) ABSTRACT

An inflator bracket for a side curtain vehicle airbag assembly of a type for mounting along a roof rail of a motor vehicle interior and mounting an inflator for generating inflation gas for a side curtain airbag. The inflator bracket in the form of a formed sheet metal component providing a carrier section adapted to engage and support the inflator and extending to form a base section and forming at least one mounting tab having a hole therethrough for enabling a threaded fastener to fasten the bracket to the roof rail. A shelf formed by the bracket positioned between the mounting tab and the carrier section and extending generally perpendicular to the base section provides clearance for the fastening of the threaded fastener without interference with the curtain airbag. The bracket is provided in the form of an integrated structure incorporating the carrier section, the base section, the mounting tab, and the shelf.

9 Claims, 6 Drawing Sheets

(56) References Cited

U.S. PATENT DOCUMENTS

| | | | |
|---|---|---|---|
| 2005/0067814 A1* | 3/2005 | Hayashi | B60R 21/26 280/728.2 |
| 2005/0173902 A1* | 8/2005 | Boxey | B60R 21/2171 280/730.2 |
| 2007/0132217 A1* | 6/2007 | Seong | B60R 21/213 280/730.2 |
| 2009/0184494 A1* | 7/2009 | Dominissini | B60R 21/217 280/728.2 |
| 2011/0163521 A1* | 7/2011 | Gammill | B60R 21/232 280/728.2 |
| 2012/0119048 A1* | 5/2012 | Kim | B60R 21/213 248/309.1 |
| 2013/0241892 A1* | 9/2013 | Shamaie | G06F 3/017 345/175 |

* cited by examiner

SIDE CURTAIN AIRBAG COMPRESSION INFLATOR BRACKET

FIELD OF THE INVENTION

This invention relates to a component for a motor vehicle side impact curtain airbag assembly and particularly to features of the curtain airbag assembly which enhance reliable and rapid assembly of the unit to an associated motor vehicle while providing low-cost component design and minimizing the number of discrete components.

BACKGROUND

Inflatable restraint devices commonly referred to as airbags are used in many applications for motor vehicle occupant impact protection. Airbags are used for frontal impact protection and are generally installed in the vehicle steering wheel for the driver and behind the vehicle instrument panel for other front seat occupants. In addition to frontal impact protection, inflatable restraints are being used in a widespread manner for occupant protection from side impacts. One group of such devices is typically mounted to the vehicle seat or the vehicle body B pillar to protect the lower torso of the occupant. So-called side curtain airbags are typically mounted along the roof rail and deploy in a downward direction to provide an energy absorbing structure between the occupant's upper torso and head, and the vehicle interior components.

Inflatable restraint systems incorporate an inflator which is typically a pyrotechnic device or one using compressed gas (or a hybrid type). A sensor or suite of sensors is provided which cooperate with an onboard controller (electronic control unit or ECU) to sense impact forces and provide a signal to deploy the inflatable restraints. Gas supplied by the inflator quickly inflates the restraint device.

Airbag systems need to be compact when not in use, particularly in view of increasingly stringent packaging requirements associated with modern day passenger car motor vehicles. A particular constrained area is along the roof rail of the vehicle where side curtain airbags are installed. There is little space available in the transverse cross-section of the roof rail between the structural metal components of the roof rail and the interior trim.

Certain designs of side-impact curtain airbag assemblies incorporate an elongated cylindrical inflator which is packaged with a rolled or folded up fabric curtain element with associated bracket elements which are all packaged for mounting to the roof rail. It is desirable to be able to fold and compress the undeployed side curtain to minimize its packaging volume. Further complicating this objective is the presence of gas flow baffles or guides or other internal elements provided to direct inflation gases from the inflator in fore and aft directions, and downward and prevent gases from degrading or rupturing the curtain fabric material. One such flow guide element is referred to as a "Y sock" formed of fabric material and named for the presence of a flow inlet passage and a pair of flow directing ducts. The flow directing elements with the airbag fabric present many layers of material which must be compacted and fit into the tight packaging region available.

A particular design and assembly challenge is posed when mounting the curtain assembly to the vehicle roof rail structure which is normally accomplished using threaded fasteners. Ordinarily a mounting bracket with a pair of mounting flanges or tabs is provided which are oriented to extend downwardly from the compacted side curtain assembly. Fasteners are installed through holes in the mounting tabs. These fasteners typically have an enlarged head or washer provided for structural purposes. An improper assembly which is essential to avoid is a condition where the threaded fastener engages the fabric of the airbag during assembly, pinching it between the fastener head and the mounting tab. This condition could give rise to deployment failures and can structurally compromise the curtain fabric. Various approaches to avoiding these problems have been implemented and proposed. For example, discrete polymer tubs or deflector tabs can be provided which are attached to a sheet metal inflator bracket which protect the area of the mounting tab from interference. It is necessary for these elements to be fastened to the metal bracket before the fastener is installed. While these devices operate satisfactorily in general, the requirement of providing separate components and the intermediate assembly process of fastening these components to the metal bracket adds to cost and complexity of unit assembly. Another solution is to use tape or another restraint wrapping around the assembly to compress the curtain fabric to provide clearance in the fastener area. Unfortunately such approaches may not be satisfactory since is generally not convenient to place such a restraint directly adjacent to the mounting tab where compression of the airbag is needed. Further alternatives may include special assembly aids which push away the side curtain fabric to clear the fastener and drive tool. This approach requires special handling by the assembly operator and verified proper assembly is not readily available. Preferred is a design which inherently prevents the above-mentioned assembly errors from occurring.

SUMMARY OF THE INVENTION

In accordance with the present invention, a curtain airbag inflator bracket is provided with integral features which ensure lack of interference between the curtain airbag fabric and the mounting fasteners during the operation of mounting the unit to the vehicle. Several embodiments are described. In each case, a tab or shelf area is presented between the mounting tabs and the rolled up or folded curtain fabric. The shelf may be localized above one or more individual mounting tabs and fasteners, or a continuous shelf can span between such areas. Embodiments described show various approaches of fabricating a sheet metal component to provide the necessary mounting bracket for the unit while also integrally forming the shelf element. Composite components may also be provided such as through over-molding on a formed sheet metal component. For all embodiments described herein, a secure and defined separation between the mounting tab area and the rolled or folded up curtain airbag fabric is provided. Such devices may be handled and assembled in accordance with prior art approaches without special requirements, while providing the reliable and rapid assembly objectives expressed previously.

DETAILED DESCRIPTION OF THE INVENTION

Figure 1:
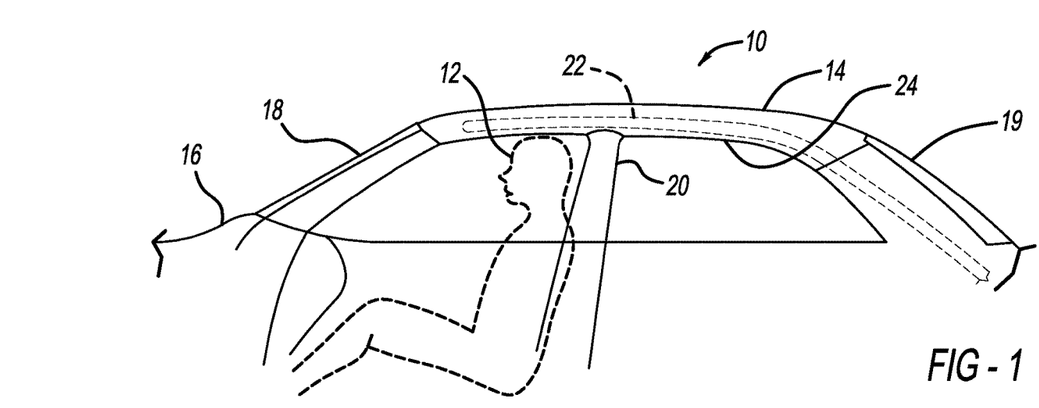
FIG. 1 is a side elevational view of a motor vehicle interior showing installation of a side curtain assembly.

With reference to FIG. 1, a portion of the interior of motor vehicle 10 is illustrated. Shown within motor vehicle 10 is a seated front seat vehicle occupant 12. Also shown is the roof 14 of the vehicle extending from engine compartment 16 and framing windshield 18 and backlight 19. Just behind the occupant 12 is a vertically extending body B pillar 20 which joins roof rail 24. Extending along both lateral sides of roof 14 and along roof rail 24 is shown, in phantom lines, side curtain assembly 22. Not shown is the interior trim which would cover side curtain assembly 22 to make it invisible to the vehicle occupant 12 when it is in the normal undeployed condition. In a manner well known in the art, deployment of side curtain assembly 22 causes a rolled up or folded side curtain 26 to deploy through the vehicle trim to extend downwardly from its undeployed condition shown in FIG. 1. As mentioned previously, the tight packaging constraints of mounting side curtain assembly 22 to roof rail 24 heighten the importance of features of the present invention.

Figure 2:
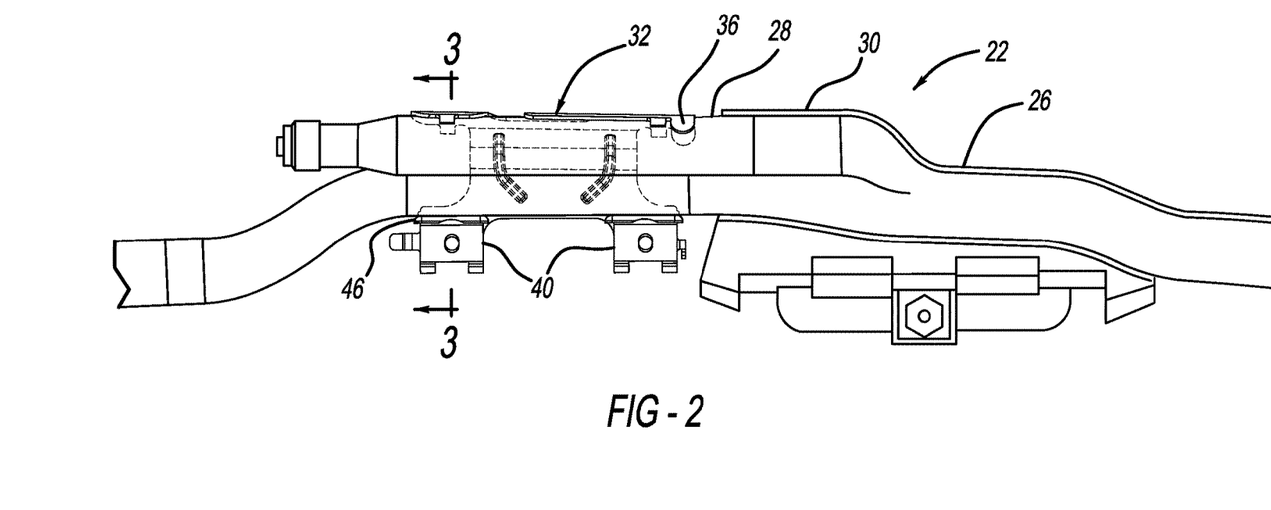
FIG. 2 is a more detailed side view of the side curtain assembly.

Now with reference to FIG. 2, a detailed side view of side curtain assembly 22 is provided. Assembly 22 includes a tubular inflator 28 having a gas discharge end which is enclosed by gas entry duct 30 of the side curtain 26. Gas entry duct 30 may be associated with separate internal flow directing elements, which are not shown. The remainder of side curtain 26 is rolled up or folded into a generally tubular stowed configuration illustrated in FIGS. 2 and 3.

Inflator bracket 32 in accordance with a first embodiment of the present invention is illustrated in FIGS. 2 through 6, and is fabricated by deforming a single sheet metal blank. The sheet metal blank is pressed or formed to define an upper inflator carrier portion 34 which partially circumscribes the cylindrical cross-section of inflator 28. Tabs 36 are provided which engage with features of inflator 28 to retain it in the mounted position illustrated in FIG. 3, for example by deforming them into corresponding receptacles or by means of an additional clamping element (not shown). Inflator bracket 34 further forms a base section 38 extending downwardly and forming a pair of mounting tabs 40. A pair of threaded fasteners 42 pass through fastener holes 44 in mounting tabs 40 to mount bracket 32 to the vehicle roof rail 24. In accordance with a principal feature of the present invention, inflator bracket 32 further forms a pair of shelves 46 extending generally perpendicular to base section 38 with cutout region 48 between them. The function of shelves 46 will be described in more detail.

Inflator bracket 32 further forms a number of additional features. Bundling hook 50 enables tape or another fastener to be wrapped around inflator 28 and the rolled or folded side curtain 26 to compress the airbag fabric which facilitates installation. Hanging hook 52 allows the side curtain assembly 22 to be retained in a hanged position in the vehicle by inserting it into a corresponding aperture or hole within roof rail 24 which will retain the assembly in position to facilitate the installation of fasteners 42.

Figure 3:
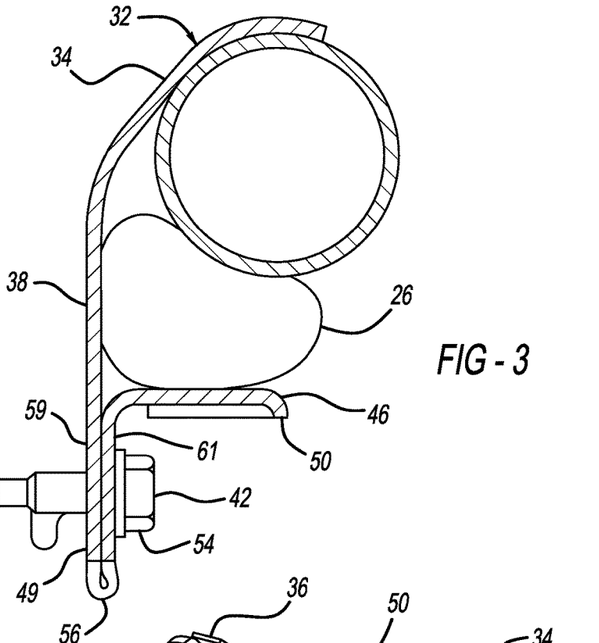
FIG. 3 is a cross-sectional view taken along line 3-3 of FIG. 2 through a side curtain assembly in accordance with the present invention shown installed to a motor vehicle.
Figure 4:
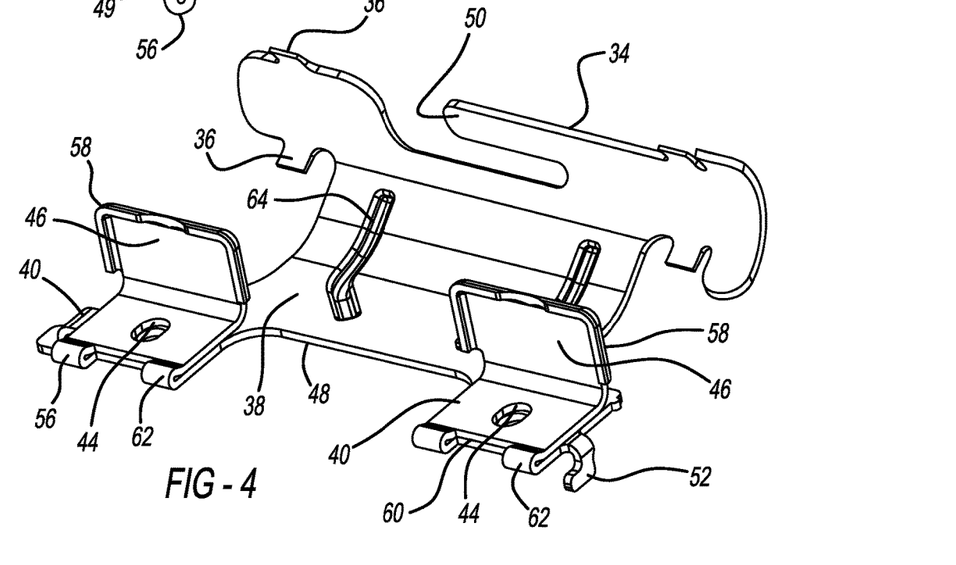
FIG. 4 is a pictorial view of an inflator bracket in accordance with a first embodiment of the invention.
Figure 5:
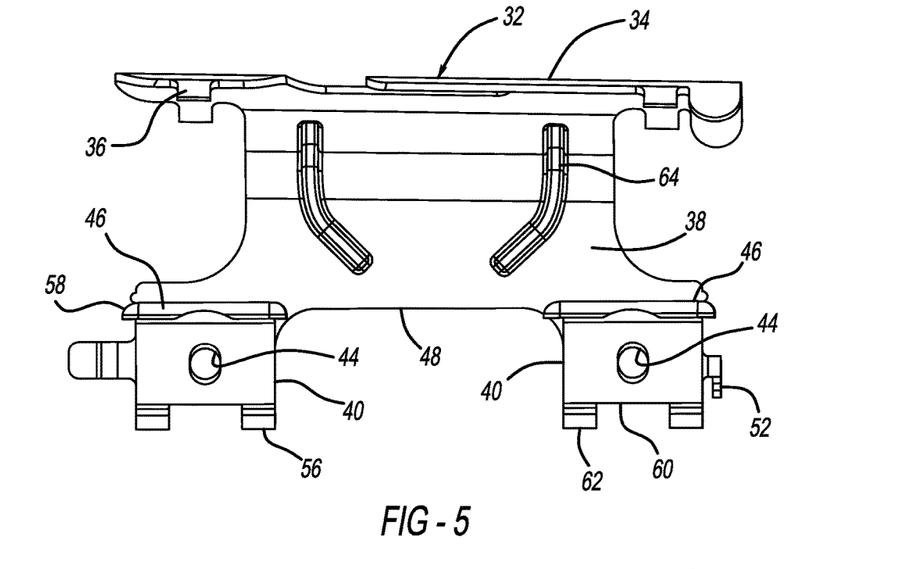
FIG. 5 is a side view of the inflator bracket shown in FIG. 4.
Figure 6:
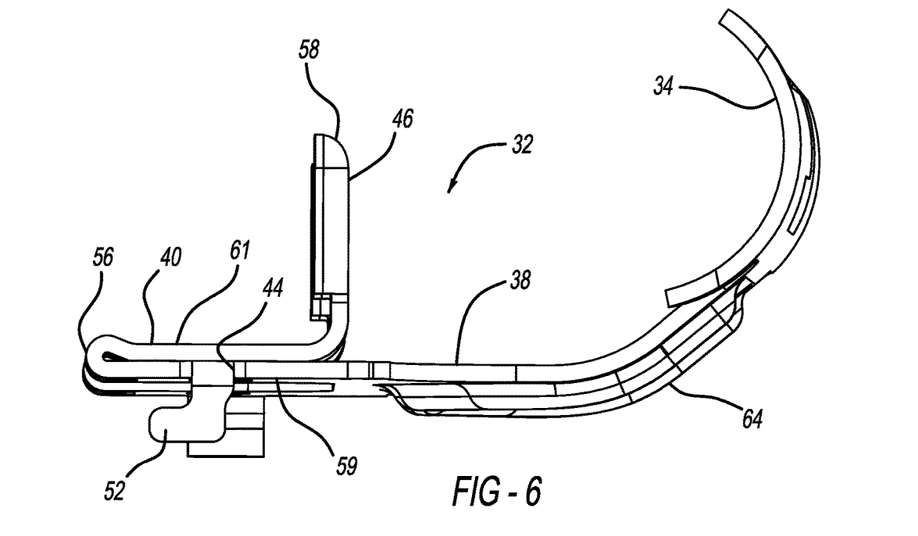
FIG. 6 is an end view of the inflator bracket shown in FIG. 4.

With particular reference to FIG. 3, shelf 46 bears against rolled up or folded side curtain 26 to prevent the fabric of the side curtain from being present in the region below the shelf 46, adjacent to mounting tab 40. As shown, a clear open area is provided over mounting tab 40 for engagement of a driving tool (not shown) fit on head 54 of threaded fastener 42 without encountering the airbag fabric. Thus shelf 46 provides a physical separation between side curtain 26 and mounting tab 40.

Additional configuration details of the first embodiment of an inflator bracket 32 are shown with particular reference to FIGS. 3-6. As shown, base section 38 extends to form one metal thickness 59 of mounting tab 40 and includes a reverse bend along fold line 56 in which the sheet metal material folds back on itself forming a second sheet metal thickness 61 of mounting tab 40, and the sheet metal further extends to form shelf 46. As a further feature, the perimeter edges 58 of shelf 46 featured a rolled over or radiused configuration which prevents interaction between sharp metal edges and side curtain 26 during its deployment. To facilitate sheet metal fabrication, fold line cutouts 60 are provided leaving a pair of folds 62 at the lateral edges of each mounting tab 40. Holes 44 are provided through both layers 59 and 61 of sheet metal forming mounting tab 40. Formed stiffening ribs 64 are provided to enhance the structural characteristics of inflator bracket 32. Since inflator bracket 32 through the presence of shelves 46 act to compress and restrain the rolled up or folded side curtain 26, it is also referred to as a curtain airbag compression inflator bracket.

Figure 7:
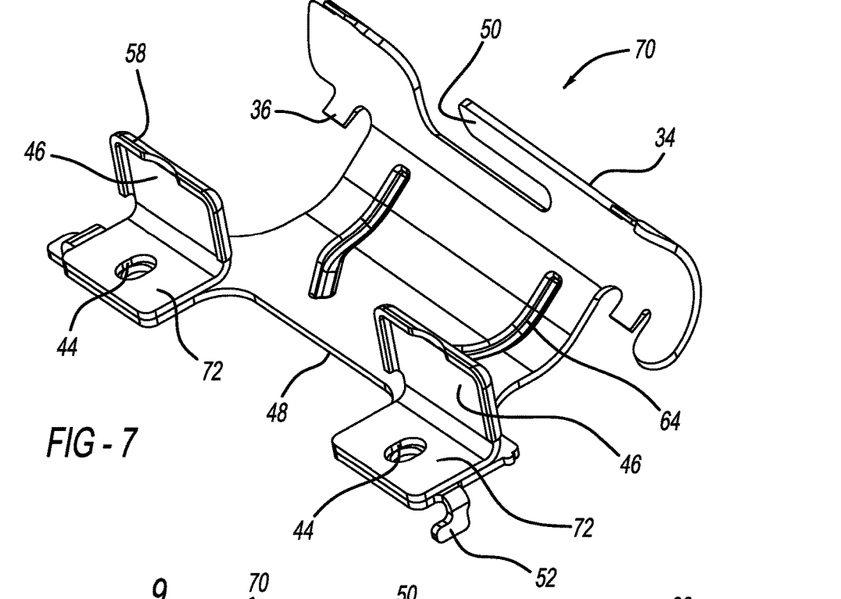
FIG. 7 is a pictorial view of an inflator bracket in accordance with a second embodiment of the invention.
Figure 8:
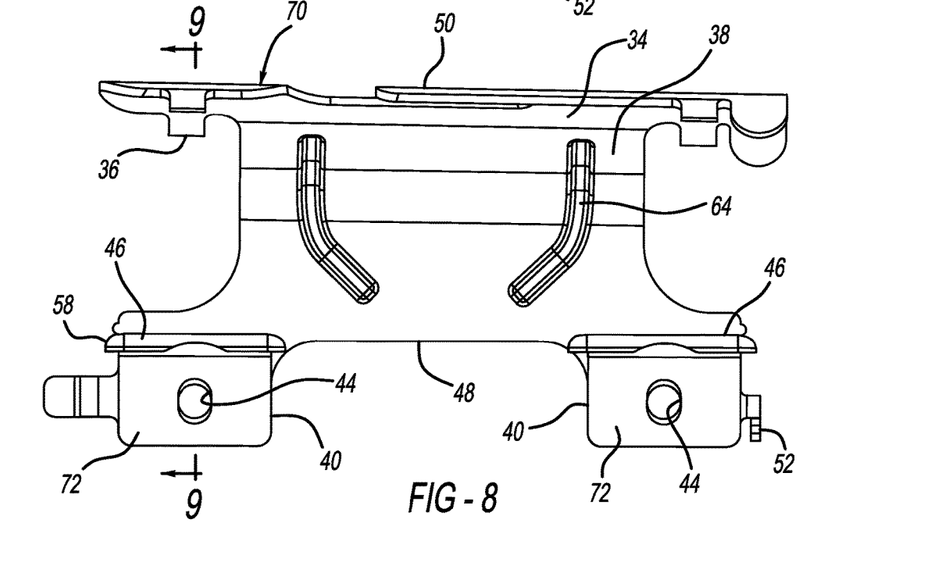
FIG. 8 is a side view of the inflator bracket shown in FIG. 7.
Figure 9:
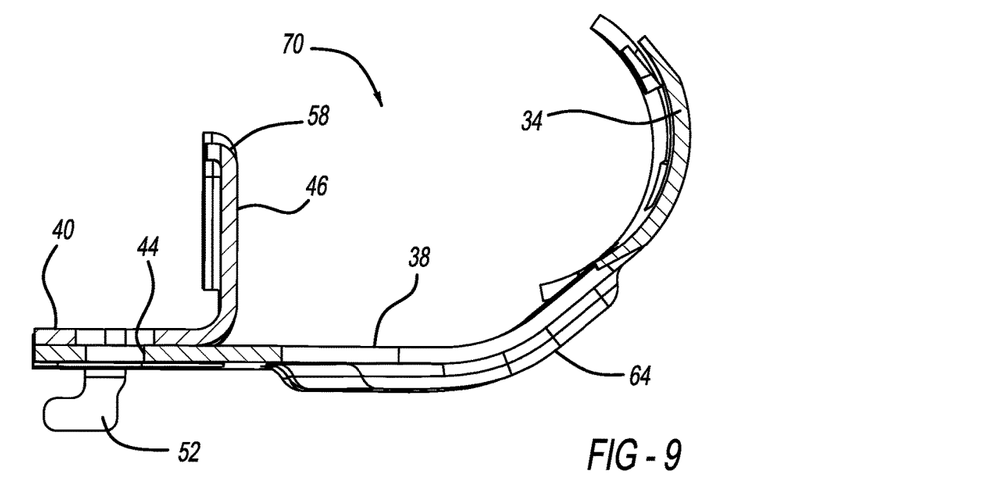
FIG. 9 is a cross-sectional view taken along line 9-9 from FIG. 8.

Now with reference to FIGS. 7-9, a second embodiment of an inflator bracket 70 is provided. Features of bracket 70 (as well as the third embodiment described below) which are identical to those of previous described inflator bracket 32 are identified by like reference numbers and a repeated description of those features is unnecessary. In accordance with this embodiment, shelf 46 is formed by a separately fabricated shelf bracket element 72 which forms shelf 46, and the second metal thickness 61 of mounting tab 40. In this embodiment however, shelf brackets 72 are separate parts and are fastened to bracket 70 by a joining process such as adhesive bonding, welding, brazing, or through mechanical interlocking deformation. Once fabricated, inflator bracket 70 is an integral unit without separate loose components thus providing the same benefits previously described in connection with inflator bracket 32.

Figure 10:
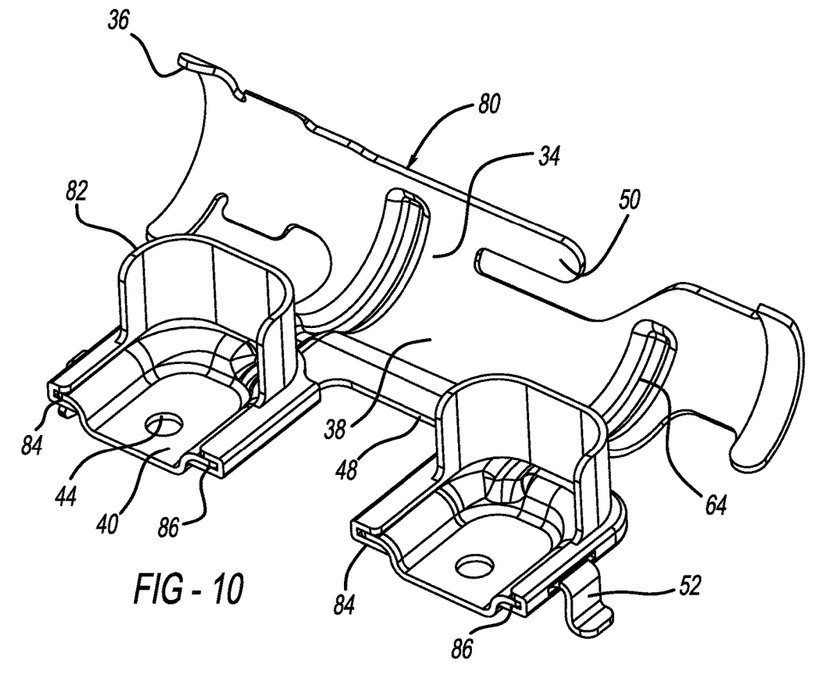
FIG. 10 is a pictorial view of an inflator bracket in accordance with a third embodiment of the invention.
Figure 11:
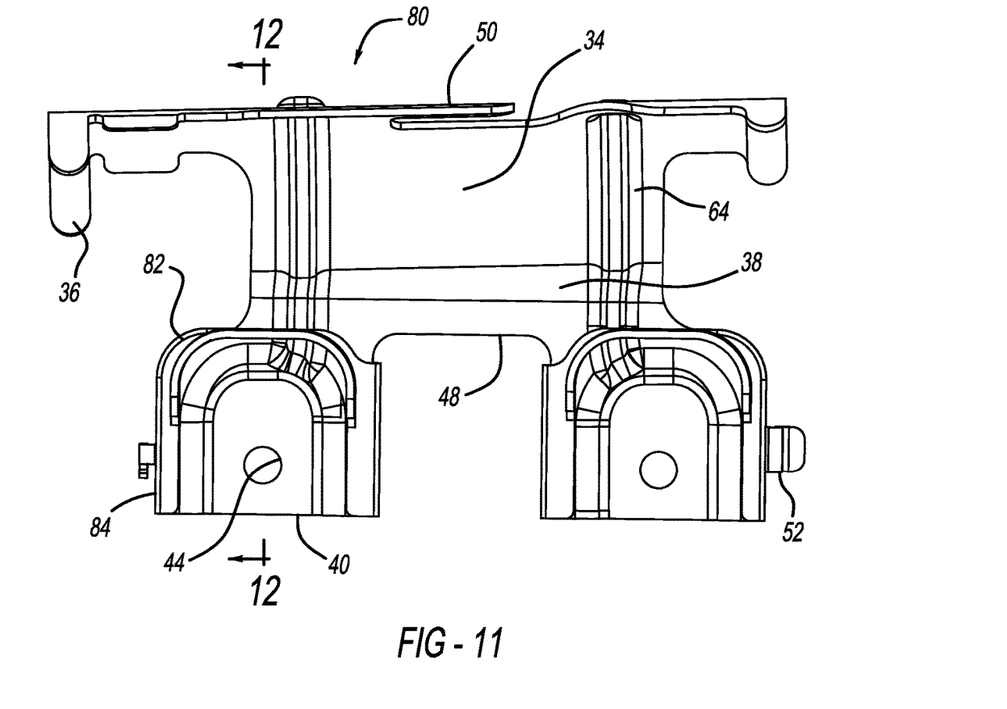
FIG. 11 is a side view of the inflator bracket shown in FIG. 10.
Figure 12:
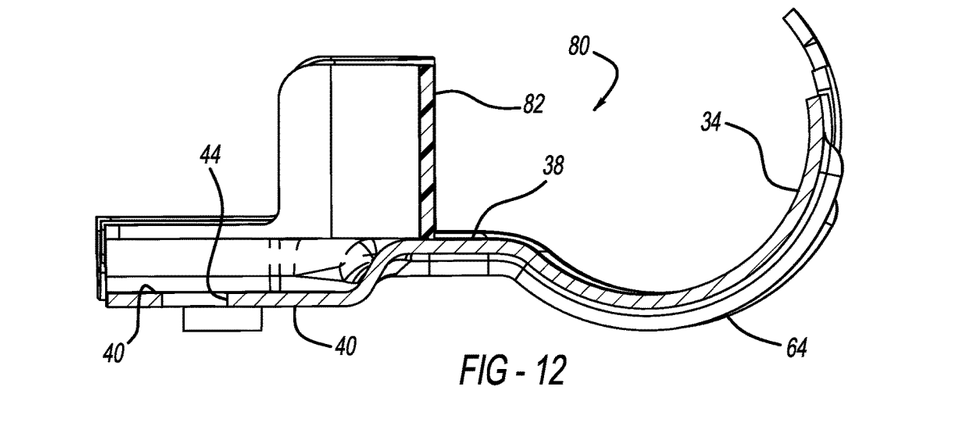
FIG. 12 is a cross-sectional view taken along line 12-12 from FIG. 11.

Now with reference to FIGS. 10-12, a third embodiment of an inflator bracket 80 is described. In this embodiment shelf 46 is formed by a separately formed polymer element which may be over molded onto mounting tab 40. As illustrated, the shelf element 82 forms shelf 46 with rounded edges and includes a perimeter attachment flange 84 which embraces upper and lower edges of the perimeter of mounting tab 42, providing secure fastening of the components. Mounting tab 40 in this embodiment features an upwardly deflected perimeter edge 86 which provides clearance for the thickness of polymer material forming shelf 82. In a possible fabrication approach the sheet metal elements of inflator bracket 80 are formed by a sheet metal pressing operation.

The intermediate component is loaded into a molding die and polymer material is introduced to form shelf 82. Following this process and integral unit is provided which prevents the assembly defect mentioned previously.

In yet a further embodiment not illustrated, the shelf element 46 formed adjacent to mounting tab 40 may be extended between two or more separate mounting tabs 40.

In a representative assembly process which may be employed in connection with any of the three embodiments of inflator bracket 32, 70, and 80, inflator 28 is first attached to the bracket carrier portion 34. Next the rolled or folded side curtain 26 is attached to inflator 28 and positioned adjacent bracket base section 38 against the one or more shelves 46. Tape or another restraint device may be wrapped around the assembly between mounting tabs 40 to compress the folded side cushion 26.

While the above description constitutes the preferred embodiment of the present invention, it will be appreciated that the invention is susceptible to modification, variation and change without departing from the proper scope and fair meaning of the accompanying claims.

The invention claimed is:

1. An inflator bracket for a side curtain vehicle airbag assembly for mounting along a roof rail of a motor vehicle interior using a threaded fastener and for mounting an inflator for generating inflation gas for a side curtain airbag, the inflator bracket comprising;
   the inflator bracket having a formed sheet metal component providing a carrier section adapted to engage and support the inflator and extending to form a base section and at least one mounting tab having a hole therethrough for enabling the threaded fastener to fasten the inflator bracket to the roof rail, and
   a shelf oriented between the mounting tab and the carrier section extending generally perpendicular to the base section for providing clearance for the fastening of the threaded fastener through the mounting tab hole without interference with the curtain airbag, the bracket provided in the form of an integrated structure incorporating the carrier section, the base section, the mounting tab, and the shelf,
   wherein the shelf is formed by a polymer material overmolded onto the tab of the inflator bracket.

2. The inflator bracket in accordance with claim 1, wherein the inflator bracket forms a first and a second of the mounting tabs with the first and second mounting tabs separated by a cutout section therebetween.

3. The inflator bracket in accordance with claim 2, wherein the shelf is a first shelf element, further comprising a second shelf element, the first shelf element being associated with the first of the mounting tabs and the second shelf element being associated with the second of the mounting tabs.

4. The inflator bracket in accordance with claim 2, wherein the shelf is a single shelf element which extends between the first and second mounting tabs.

5. The inflator bracket in accordance with claim 1, wherein the shelf forms a perimeter edge which is rolled over to prevent damage to the side curtain during a deployment of the side curtain airbag.

6. The inflator bracket in accordance with claim 1, wherein the polymer material forms a perimeter edge which embraces at least a portion of a perimeter edge of the mounting tab.

7. An inflator bracket for a side curtain vehicle airbag assembly for mounting along a roof rail of a motor vehicle interior using a threaded fastener and for mounting an inflator for generating inflation gas for a side curtain airbag, the inflator bracket comprising;
   the inflator bracket made from a single sheet metal blank forming a carrier section adapted to engage and support the inflator and extending to form a base section and at least one mounting tab having a hole therethrough for enabling the threaded fastener to fasten the inflator bracket to the roof rail, and a shelf oriented between the mounting tab and the carrier section extending generally perpendicular to the base section for providing clearance for the fastening of the threaded fastener through the mounting tab hole without interference with the curtain airbag, the single sheet metal blank integrally forming the carrier section, the base section, the mounting tab, and the shelf,
   wherein the mounting tab is formed by the sheet metal blank being folded over itself to define a fold section and with a first and a second metal thickness of the sheet metal forming the mounting tab, and extending to form the shelf.

8. The inflator bracket in accordance with claim 7, wherein the inflator bracket forms a first and a second of the mounting tabs with the first and second mounting tabs separated by a cutout section therebetween.

9. The inflator bracket in accordance with claim 7, wherein the shelf forms a perimeter edge which is rolled over or radiused to prevent damage to the side curtain during a deployment of the side curtain airbag.

* * * * *